H. L. TANNER.
SPEED OF ROTATION INDICATORS.
APPLICATION FILED FEB. 17, 1920.
1,434,799.
Patented Nov. 7, 1922.
2 SHEETS—SHEET 1.
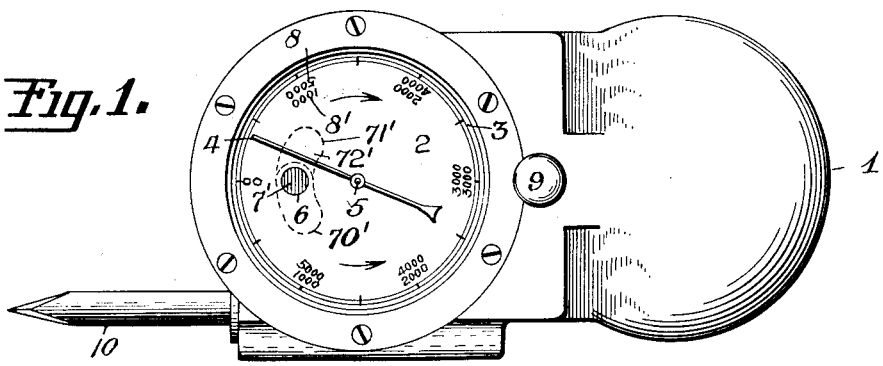
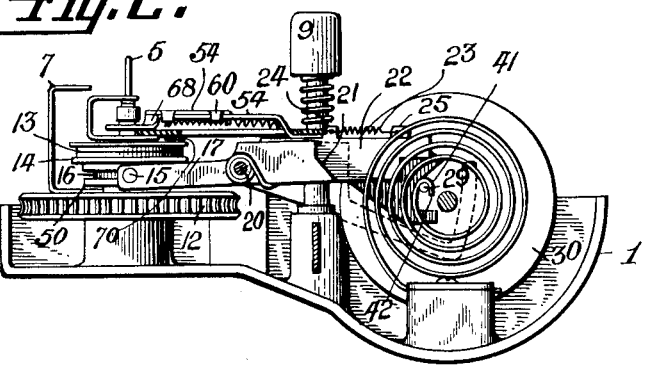
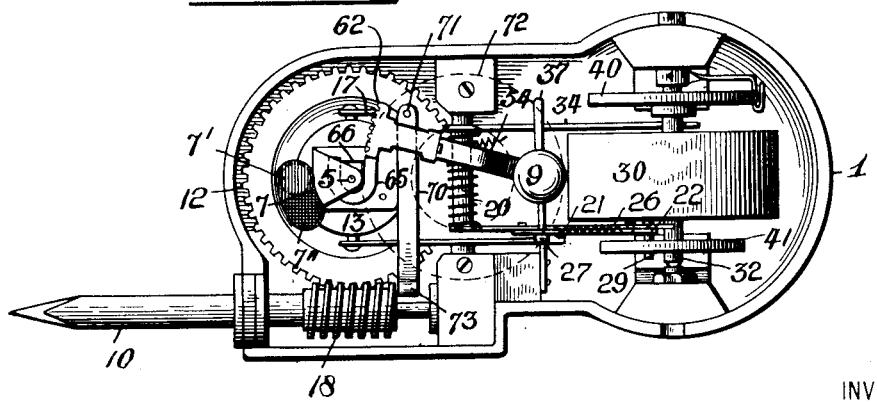
INVENTOR
HARRY L. TANNER.
BY
Herbert H. Thompson
his ATTORNEY.

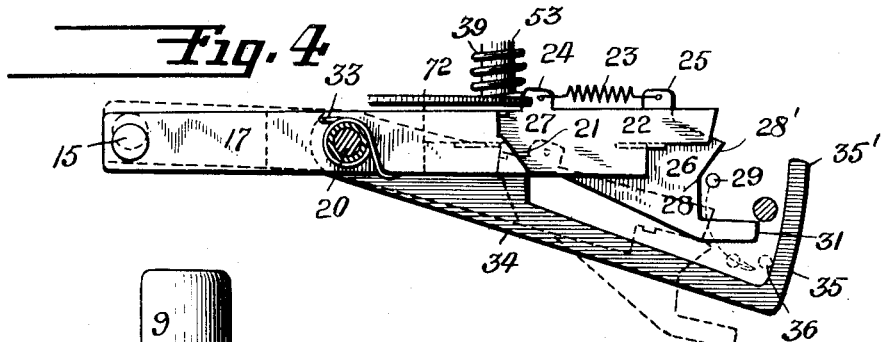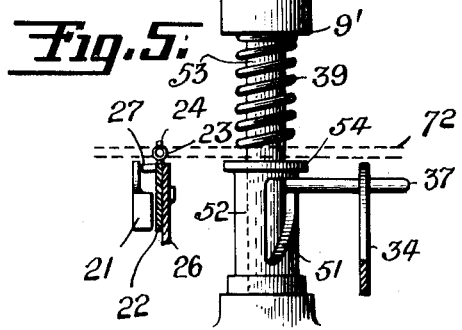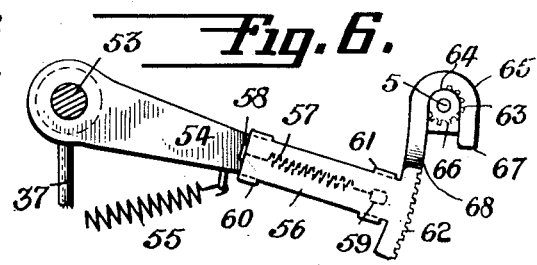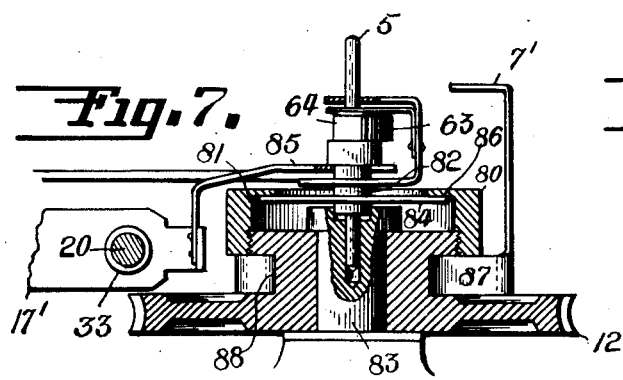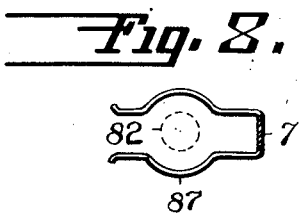

Patented Nov. 7, 1922.

1,434,799

UNITED STATES PATENT OFFICE.

HARRY L. TANNER, OF BROOKLYN, NEW YORK, ASSIGNOR TO THE TANNER ENGINEERING COMPANY, INC., OF BROOKLYN, NEW YORK, A CORPORATION OF NEW YORK.

SPEED OF ROTATION INDICATORS.

Application filed February 17, 1920. Serial No. 359,340.

*To all whom it may concern:*

Be it known that I, HARRY L. TANNER, a citizen of the United States of America, residing at Brooklyn, in the county of Kings and State of New York, have invented certain new and useful Improvements in Speed of Rotation Indicators, of which the following is a specification.

This invention relates to speed indicators for showing the speed of rotation of a shaft. More particularly the invention relates to certain improvements in the invention set forth in my former application for Letters Patent filed August 27, 1918, for "speed indicators," Serial No. 251,619. One object of the invention is to eliminate as far as possible the actual work performed by the oscillating balance wheel in controlling the clutch. Another object of the invention is the provision of an improved resetting means for the indicator. A third object of the invention is to provide a simplified means of indicating not only the speed but the direction of rotation of a shaft.

Referring to the drawings wherein I have shown what I now consider to be the preferred form of my invention:

Fig. 1 is a plan view of an indicator constructed according to my invention.

Fig. 2 is a side elevation of the indicator, the top of the casing being removed and the bottom of the casing being shown in section.

Fig. 3 is a plan view of the indicator with the top cover removed.

Fig. 4 is an enlarged detail of the levers and links connecting the finger piece, clutch, and balance wheel.

Fig. 5 is an enlarged detail of the finger piece.

Fig. 6 is an enlarged plan view of the resetting means.

Fig. 7 is an enlarged sectional view of a modified form of clutch.

Fig. 8 is a detail of the bottom portion of the target or direction indicator of Fig. 7.

The indicator shown is entirely enclosed within a two part casing 1 having a face or dial 2 provided with suitable indications 3. A pointer 4 or other suitable indicating means is secured to a shaft 5 entering within the casing. The dial may be provided with a hole 6 through which a two-colored target 7 is visible showing the direction of rotation of the shaft as hereinafter explained. One portion of the target 7' may be colored red, for instance, and the other 7" black. Two sets of figures 8 and 8' may be provided on the dial in the same colors as the target, the color of the target serving to show at a glance which set of figures to read and the direction of rotation of the shaft. Also projecting from the case is a finger piece 9 and a shaft 10, the latter being adapted to be brought into contact with the shaft whose speed is to be measured. The shaft 5 on which the pointer 4 is mounted is normally disconnected but is adapted to be coupled for predetermined intervals to the hub of a worm wheel 12 by means of clutch 13, the lower half 14 of which is movable and is connected by means of pins 15 and circumferential grooves 16 to the free end of forked lever 17. A worm 18 on shaft 10 is shown as meshing with the worm wheel 12. Said lever 17 is loosely pivoted on a cross shaft 20 and is provided at its front end with an inwardly turned beveled edge 21 (Figs. 2, 4, and 5). Immediately behind said lever is mounted a slide 22, normally pulled to the right in Figs. 2 and 4 by means of spring 23 extending between an ear 24 thereon and a corresponding ear 25 on a lever 26 to the rear of said slide and on which the same is slidably mounted. The slide is provided with a laterally extending lug 27 which is adapted to engage the top of edge 21 when the slide is in its extreme position to the right and depressed (see dotted line position Fig. 4). When the slide is pushed slightly to the left, however, the lug 27 slips off the rear of edge 21 thereby releasing the same and permitting the outer end of lever 17 to be thrown upwardly and the inner end downwardly thereby releasing the clutch. Lever 26 on which slide 22 is mounted is shown as provided at its forward end with a V-shaped notch 28 between the edges of which a pin 29 on the balance wheel 30 normally rests. As long as rotation of the fly wheel is prevented, lever 26 cannot be rotated, due to the engagement of inclined surface 28' with pin 29. Said lever is also shown as provided with a forwardly extending finger 31 adapted to engage the pin 29 normally to limit the downward movement of the pin and wheel. Said lever 26 is secured to cross shaft 20 on which is mounted a coiled spring 33. Loosely mounted on said cross shaft 20 is a long lever 34 extending to the right on the opposite side of the balance wheel from said other levers and provided adjacent its end with an upturned portion 35. A second pin 36 on the opposite side of the fly wheel from pin 29 is adapted to contact with said upturned end to prevent normally the movement of the fly wheel in the direction of the arrow in Fig. 4 and thus prevent rotation of lever 26. Finger piece 9 is connected to lever 34 by means of a pin 37 (Figs. 3 and 5) so that on depressing the finger piece lever 34 is depressed. The hub of lever 34 is connected to lever 26 by coiled spring 33. Depression of finger piece 9, therefore, not only compresses the spring 39 under the enlarged cap 9' of the finger piece but also coils up or places under tension the spring 33 around the shaft 20, since lever 26 cannot rotate on account of pin 29, until end 35 of lever 34 releases pin 36. The fly wheel is provided with some form of hair spring 40 and also may be provided with a cushioning or spring stop 41 in the form of a coiled spring having a looped end 42 adapted to catch and retain the pin 29 on balance wheel 30 and hold it in said V notch 28. The depression of the finger piece, therefore, first brings the upper edge 28' of the V notch 28 into contact with pin 29. Any substantial movement of the balance wheel is prevented, however, by the engagement of the pin 36 with the hook or upturned end 35. Further depression of the finger piece will, therefore, not move the balance wheel but will place under tension or compression springs 33 and 39. As the finger piece is further depressed, however, the end 35' of said hook 35 will be moved out of the path of the pin 36. Lever 26, therefore, under the influence of the coiled spring 33 will immediately impart an impulse to the balance wheel and rotate it in a counterclockwise direction (Fig. 4) to approximately the dotted line position in Fig. 4. At the same time the lever 17 will be rotated clockwise by the engagement of lug 27 with edge 21 as explained. Thus at the time an oscillation is imparted to the fly wheel, the clutch 13 is thrown in. The balance wheel then oscillates over as far as the hair spring will permit and back again. On its return pin 29 first strikes slide 22, pushing it to the left to release edge 21 from lug 27, thereby permitting clutch 13 to open. Further movement of the fly wheel carries pin 29 into the hooked end 42 of spring stop 41. The thumb piece 9 is then released and the levers returned to their normal position, pushing pin 29 and wheel 30 around until the pin slips by the upper edge 28' and back into the V notch 28, in which position the parts are ready for another operation.

As heretofore stated, the direction of rotation is indicated by target 7. Said target is shown as formed of thin sheet metal, having the upper end bent inwardly to form the target proper, the middle portion vertical, and the lower end also bent inwardly and frictionally but lightly clamped between the lower face 50 of the lower clutch member 14 and gear 12. The ends 70' and 71' of a shallow channel 72' cut in the under face of the top part of cover 1 may act as stops to prevent target 7 from being moved out from under hole 6.

To reset the indicator, the following mechanism may be employed. Pin 37 on stem 53 of thumb piece 9 extends through a spiral or cam slot 51 of rotatable sleeve 52 loosely mounted about stem 53. Secured to the top of said sleeve is shown an arm 54 normally pulled clockwise in Fig. 3 by spring 55. Said arm has slidably mounted adjacent its end a slide 56 which is normally pulled outwardly by spring 57 extending between lug 58 on slide 56 and lug 59 on arm 54. Slide 56 may be provided with ears 60, 61 enclosing said arm to guide the same. On its end, the slide is provided with teeth 62 adapted to engage teeth 63 on mutilated pinion 64 on stem 5 when it is turned a certain amount away from the zero position.

Arm 54 is also provided with a hook shaped end 65, which normally embraces an eccentric block 66 also on stem 5 below said pinion. It will readily be seen that if shaft 5 is not turned through more than 90° or even a little more than 90° in either direction, it will be returned to zero by the engagement of either the end 67 of hook 65 or shoulder 68 (Fig. 2) in said arm formed by a downward bend in said hook at its juncture with the arm, according to whether shaft 5 were rotated counter-clockwise or clockwise in Fig. 6. If, however, said shaft were rotated through materially more than 90° in either direction, teeth 62 would strike mutilated pinion teeth 63 and rotate shaft 5 through a sufficient angle for the aforesaid resetting means to come into action. By having slide 56 spring pressed wedging of the teeth is avoided. As thumb piece 9 is pressed down arm 54 is rotated downwardly in Fig. 3 and upon release of the thumb piece, the arm is returned by spring 55, thereby resetting the index 4 on shaft 5.

In order to quickly damp the oscillation of the index, I may make use of a flat spring 70 secured at one end 71 to the under side of supporting ring 72 and passing immediately above upper clutch member 13 and normally not touching the same. At its free end said spring is provided with an upturned end 73, which lies in the path of hook 65 so as to be depressed thereby when arm 54 is rotated downwardly in Fig. 3. This brings the spring into frictional contact with said member 13 when, and only when, the clutch is in engagement so that the resetting of the indicator is not hampered.

Fig. 7 shows a slightly modified form of clutch. In this form the worm gear 12 has secured to the hub thereof a threaded cap 80 by which an annular space 81 is formed. A rotatable shaft 82 is slidably mounted in a central post 83 and has secured thereto a clutch disc 84. The lever 17' has secured to its forward end a fork 85 embracing the said shaft 82 so that said lever on revolving about shaft 20 will lift the shaft 82 and cause engagement between the clutch disc 84 and the inner annular face 86 of the cap 80. In this form also the direction indicator 7' is shown as mounted on a spring clip 87 resiliently and frictionally clamped about the hub 88 of gear 12. (Fig. 8.)

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a speed indicator, an index rotatable in two directions, a plurality of sets of graduations adapted to be read in conjunction with said index when moved in either direction, and means responsive to the direction of rotation of the indicator for indicating which set of graduations to employ.

2. In a speed indicator, the combination with a balance wheel having a period of oscillation, a finger piece, spring means adapted to be energized by said piece for causing an oscillation of the wheel, means for preventing turning of said wheel until said means is energized, a normally inoperative clutch, means for throwing in said clutch upon release of said wheel, and means for throwing said clutch out upon the return of said wheel.

3. In a speed indicator, a balance wheel, means for releasing said wheel at will, a continuously driven member, an indicating member and means brought into action by an oscillation of said wheel but actuated by said releasing means, for driving said indicating member from said driven member for a predetermined portion of an oscillation.

4. In a speed indicator for shafts, the combination with a clutch adapted to connect the indicator and shaft, a balance wheel, means for causing an oscillation thereof, means released with said wheel for closing said clutch and a trip operated by the return of said wheel for opening said clutch.

5. In a speed indicator for shafts, the combination with a clutch adapted to connect the indicator and shaft, a balance wheel, a yielding lever for imparting an oscillation to said wheel, a second lever associated therewith for closing said clutch and a trip operated by said wheel for releasing said second lever from the first to release the clutch.

6. In a speed indicator for shafts, the combination with a rotatable indicator, a clutch for operating the same, hand means for setting the indicator in operation, a resetting means for said indicator operable on release of said means, a damping means for said indicator and means for bringing the same into operation when said clutch is closed.

7. In a speed indicator for shafts, the combination with a rotatable indicator, a clutch for operating the same, a resetting means for said indicator, a damping means for said indicator, and means whereby the same is rendered inoperative when said resetting means is in operation.

8. In a speed indicator for shafts, an indicator, a balance wheel, a resetting means for the indicator, spring means for imparting an impulse to said wheel, a release for said wheel, spring means for operating said resetting means, and a thumb piece adapted to energize both said spring means and to release said wheel.

9. In a resetting means for rotatable indicators, the combination with the indicator, a cam member and a mutilated gear connected therewith, a hook-shaped member adapted to embrace said cam to rotate it back to its original position, and a gear sector adapted to mesh with said other gear to assist in such resetting operation.

10. In a resetting means for rotatable indicators, the combination with the indicator, a hand member for setting said indicator into operation, and means operable on release of the hand member for resetting said indicator comprising a lever, a plurality of members connected to the indicator of different characteristics, and a plurality of cooperating devices on said lever adapted to successively engage said members to reset the indicator.

11. In a speed indicator for shafts, the combination with a clutch adapted to connect the indicator and shaft, a balance wheel, means for causing an oscillation thereof and for closing said clutch, spring means for normally holding said clutch open, and a trip adapted to be operated directly by said wheel for releasing said clutch.

In testimony whereof I have affixed my signature.

HARRY L. TANNER.